3,832,269
ANTI-DUST SHEETS
Richard Butler Macmillan, Welwyn, and Iolo Llewelyn Lewis, Welwyn Garden City, England, assignors to Imperial Chemical Industries Limited, London, England
No Drawing. Filed July 24, 1972, Ser. No. 274,617
Int. Cl. B32b 15/08, 27/08, 27/32
U.S. Cl. 161—162     7 Claims

ABSTRACT OF THE DISCLOSURE

A laminated thermoplastic sheet having an anti-dust surface, comprises at least one foil containing carbon black (preferably containing at least 10 parts by weight of carbon black per 100 parts by weight of thermoplastic) preferably sandwiched between other foils not containing carbon black which provide the anti-dust surface. The anti-dust surface is preferably situated less than 2.3 mm. from the nearest surface of a foil containing carbon black. The invention is particularly useful for poly(vinyl chloride) sheeting.

---

The present invention relates to anti-dust thermoplastics sheets, i.e. sheets of thermoplastics material having surfaces rendered non-attractive to atmospheric dust or ash.

One of the problems associated with sheets made from many types of thermoplastics materials or sheet-like articles made from such materials is their tendency to collect dust or ash on any exposed surface. This is particularly noticeable in the case of sheeting made from vinyl chloride polymers where the exposed surface of the sheet tends to collect a static electrical charge on being contacted with other materials and thus tends to attract small particles of dust or ash floating around in the atmosphere. This effect may be readily and rapidly exemplified by rubbing or striking the surface of a sheet of a vinyl chloride polymer with for example a nylon cloth, when the surface of the rubbed or struck sheet acquires a static charge and strongly attracts small particles of dust or ash situated near to it.

Attempts have been made to overcome this problem by trying to render anti-static any surface of a sheet that is likely to be exposed to the atmosphere, i.e. attempting to ensure that such a surface will not acquire an electric charge on standing or being rubbed and thereby not attract dust or ash. Such sheets have become known as anti-static sheets.

One way that has been attempted to produce such an anti-static sheet is to coat the surfaces of the sheet, e.g. by spraying or dipping, with certain materials known as anti-static materials. Examples of such materials include quaternary ammonium compounds, amines, polyglycols, alcohols, esters, ethylene oxide derivatives and sulphonates. However, this technique suffers from the disadvantage that the anti-static property of the treated surface is lost or is much diminished if that surface is washed or wiped during service, and although some recovery is apparent with time, the final level of anti-static effectiveness is always considerably lower than the original level.

Another method that has been used to combat the dust-attracting tendency of thermoplastics sheets is to incorporate into the sheet during its manufacture certain anti-static materials of the type mentioned above. Thus in this technique the anti-static material is evenly distributed throughout the whole body of the sheet and not situated merely at the surface. Although many anti-static materials are ineffective when used in this way, one particular material, viz. carbon black, has been found to be effective, and when incorporated into a sheet of thermoplastic material renders that sheet strongly anti-static so that the sheet displays negligible affinity for atmospheric dust or ash.

However, the incorporation of carbon black into a sheet has certain drawbacks. Firstly, the colour of the whole sheet is necessarily black, and this is a severe limitation on the external appearance of the sheet which is often required to exhibit surfaces of one colour or another for aesthetic and other reasons, such as the ability to reflect sunlight. The incorporaiton of carbon black is thus unsatisfactory if part of the surface of the sheet must be a colour other than black. Secondly, the incorporation of carbon black into the body of the whole sheet tends to be expensive and somewhat wasteful since it is only the surface of the sheet that is of importance. Thirdly, the incorporation of carbon black into the body of the whole sheet tends to embrittle the sheet.

We have now developed anti-dust sheets which although containing carbon black may not have the above-mentioned disadvantages.

Therefore, according to the present invention we provide a laminated sheet or sheet-like article made of thermoplastics material having an anti-dust surface comprising at least one pre-formed foil having carbon black incorporated therein and at least one other pre-formed foil not having carbon black incorporated therein, the last mentioned foil providing an outer surface of the laminated sheet as an anti-dust surface.

It is to be understood that the term "foil" includes the term "sheet."

The simplest embodiment of our invention comprises a single pre-formed foil of thermoplastics material containing carbon black laminated directly against a single pre-formed foil of thermoplastics material not containing carbon black, the exposed surface of the foil not containing carbon black being the anti-dust surface. The two foils may, if desired, be separated from one another by one or more intermediate foils not containing carbon black. It is, however, more preferred to employ a sandwich type of laminate construction in which the foil containing carbon black does not form an outer surface of the sheet.

Therefore, according to the present invention we also provide a laminated sheet or sheet-like article made of thermplastics material having an anti-dust surface comprising at least one pre-formed foil having carbon black incorporated therein sandwiched between other pre-formed foils not having carbon black incorporated therein, so that at least one of the outer surfaces of the laminated sheet which are provided by two foils not having carbon black incorporated therein provides an anti-dust surface. Each outer foil may be directly adjacent to a foil containing carbon black or may be separated therefrom by one or more intermediate foils not containing carbon black.

We have stated that "at least one" of the outer surfaces of the preferred laminated sheet of our invention provides an anti-dust surface, because, in use, one of the outer surfaces of the sheet may not be exposed and will not need to be unattractive to dust, However, it is to be understood, that the sheet or sheet-like article can be prepared in such a way that both outer surfaces can if required provide an anti-dust surface.

The simplest form of our preferred embodiment comprises a single foil of thermoplastics material having carbon black incorporated therein sandwiched between two outer foils of thermoplastics material not containing carbon black. One or more intermediate foils not containing carbon black may be situated between the foil containing carbon black and each outer foil having an exposed surface.

In another example of our preferred embodiment two or more foils containing carbon black are situated in a laminated sheet of thermoplastics material such that the exposed surface of each of the two outer foils of the laminated thermoplastics sheet exhibits anti-dust properties. The foils containing carbon black may be separated from one another by other layers not containing carbon black and in such cases may be conductively interconnected by means of suitable bridging members.

We also provide a process for the production of a laminated sheet as hereinbefore defined comprising forming the component foils of the laminate which comprise at least one foil having carbon black incorporated therein and at least one other foil not having carbon black incorporated therein, assembling the foils one upon the other in the required order for the laminate so that said at least one foil not having carbon black incorporated therein is positioned to provide an outer surface of the laminated sheet, and applying heat and pressure to the assembly of foils to form the laminate.

When producing the preferred laminated structure of our invention, the assembly of foils comprises at least one foil not having carbon black incorporated therein sandwiched between at least two other foils not having carbon black incorporated therein which provide the outer surfaces of the laminated sheet.

The term "anti-dust" rather than "anti-static" is used because the exposed surface of the laminated sheet is believed to be rendered unattractive to dust or ash not by reason of the surface charges being eliminated or diminished, but because the layer containing carbon black minimizes the external effects of the surface charges by concentrating the electric field associated with the charges, so that the major part of this field lies within the plastics sheet and only a minor residual part passes into the surrounding medium. In this way charged particles in the surrounding medium are not attracted towards the surface. Similarly dipoles are not induced on any surrounding uncharged particles which are not therefore attracted towards the surface. On this theory the surface is not "anti-static" because the surface charge is still there. The correrctness or otherwise of this theory, however, is immaterial to the present invention.

Besides being unattractive to dust or ash, the sheets or sheet-like articles of the invention may often be usefully and safely employed in areas where there is a danger of igniting inflammable gases or vapours, or mixtures thereof, or dust clouds which exist in the surrounding atmosphere, owing to the fact that they create less ionization of the adjacent surrounding atmosphere than a similarly charged sheet or foil not containing carbon black. Thus the term "anti-dust" is meant to encompass a much wider meaning than its strict literal interpretation.

The sheets or sheet-like articles of the invention may be made from any suitable thermoplastics material or materials or blend of thermoplastics materials that can be processed into foils and laminated together. The thermoplastics material of the foil or foils containing the carbon black may be the same as or different from the thermoplastics material of the foils not containing the carbon black. Furthermore, if a laminated sheet contains two or more foils containing carbon black, the thermoplastics material of those foils may be the same or different. Similarly, among the foils not containing carbon black, the thermoplastics material may be the same or different. In all cases, however, where laminated sheets comprise two or more different thermoplastics materials or blends of thermoplastics materials, the thermoplastics material of adjacent foils in the composite laminated sheet should be sufficiently compatible if they are different for an acceptably strong bond to be formed between the foils on lamination.

Examples of suitable thermoplastics materials that may be used in the preparation of sheets according to the invention particularly include polymers and copolymers of vinyl chloride, optionally containing a plasticizer, and chlorinated poly(vinyl chloride).

Other suitable thermoplastics resins are polymers and copolymers of $\alpha$-olefines such as low- and high-density polyethylene, polypropylene and polymers of 4-methyl pentene-1. Polymers and copolymers of halogenated $\alpha$-olefines may also be used. Copolymers of the olefines from which the above polymers are derived may also be used: in particular copolymers of ethylene and propylene. These olefines may also be copolymerized with other monomers and this type of copolymer may also be used. For example copolymers of ethylene and vinyl acetate may be used. The amounts of the comonomers that are used in these various copolymers will depend on the properties required of the sheet. Other examples of suitable thermoplastics materials include: polymers and copolymers of styrene and substituted styrenes such as $\alpha$-methyl styrene; polymers and copolymers of acrylonitrile (especially with styrene); and polymers and copolymers of butadiene. One particularly useful class of thermoplastics materials consists of the copolymers of acrylonitrile, butadiene and styrene. Polymers and copolymers of methyl methacrylate may also be used; the preferred copolymers of methyl methacrylate are those which contain minor amounts of alkyl acrylates such as methyl acrylate, ethyl acrylate and butyl acrylate. Linear polyesters such as poly(ethylene terephthalate) and poly-butylene terephthalate) may also be used. Examples of other thermoplastics materials include polyamides such as polycaprolactam, poly(hexamethylene adipamide) and copolyamides such as copolymers of hexamethylene adipamide and hexamethylene isophthalamide; polysulphones and copolysulphones; poly(phenylene oxides) and other chain-substituted polyarylenes; polymers and copolymers of vinylidene chloride; oxymethylene polymers and copolymers; polycarbonates; polymers and copolymers of vinyl acetate; polymers and copolymers of vinyl butyral; and the thermoplastics derivatives of cellulose such as cellulose acetate, cellulose nitrate and cellulose butyrate. Blends of these thermoplastics materials may also be used.

The choice of thermoplastics material and any combinations thereof will, of course, depend upon the use to which the sheet or article being produced will be put, and the foils may contain different additives or fillers to achieve various properties or combination of properties.

While the sheets or sheet-like articles of the invention may be made of any suitable thermoplastics material, the thermoplastics material employed is preferably a vinyl chloride homopolymer or copolymer. When the foil providing the anti-dust surface is made of a vinyl chloride polymer, particularly polyvinyl chloride itself, the anti-dust surface should preferably be spaced less than 2.3 mm. over substantially all of its area from the nearest surface of a foil containing carbon black which should preferably contain at least 10 p.h.r. of carbon black, i.e. 10 parts by weight of carbon black per hundred parts by weight of the thermoplastics material constituting the foil. Preferably the foil contains from 20 to 50 p.h.r. of carbon black and particularly between 40 and 50 p.h.r. Although it is possible in some circumstances to incoporate more than 50 p.h.r. of carbon black into a foil this is not often feasible, particularly in the case of foils of vinyl chloride polymers, because of incompatibility problems, so that 50 p.h.r. is the preferred upper limit.

The carbon black may be incorporated into a thermoplastics foil in any convenient manner. For example, the basic polymer powder, together with any necessary or desired ingredients such as processing aids, fillers, impact improvers, lubricants, plasticizers or stabilizers, may be mixed with the carbon black in a mixer such as a Gardner or Henschel mixer wherein the mixture is subjected to shear and/or heat and is turned into a homogeneous powder which is is thereafter processed by any standard technique such as milling, calendering, extruding or injection-moulding, either directly from the ungelled polymer powder or after first converting the polymer into gelled compound via for example a Banbury mixer and then milling, calendering, extruding or injection-moulding. The carbon black may alternatively be coated round the polymer particles as described in our British patent specification 1,241,297.

The carbon black itself is usually supplied from commercial manufacturers in the form of a fluffy powder or pellets, and the different grades of carbon black from the various manufacturers normally vary in certain properties such as oil-absorption capability and electrical resistivity. While all grades of commercially available carbon black are effective to at least some extent in the anti-dust laminated sheets of the invention, some grades are very much more effective than others, depending upon their electrical resistivity. In general, the lower the electrical resistivity of the grade of carbon black the more effective it is in the sheets of the invention, and less will be required of one grade of carbon black to achieve a certain effectiveness of anti-dust behaviour than that of another grade of higher electrical resistivity. The most effective grade of commercially available carbon black found thus far, and the one which it is therefore preferred to use, is known under the trade name of "Vulcan" XC–72, which is sold in the form of pellets or fluffy powder by the Cabot Corporation of the United States of American and is particularly effective in sheets or sheet-like articles made of vinyl chloride polymer when incorporated at the level of 40 to 50 p.h.r. of the foil containing the carbon black.

In the sheets or sheet-like articles of the invention, the nearer the exposed surface is to the nearest layer containing carbon black, the stronger is the anti-dust effectiveness of the exposed surface. The anti-dust effectiveness of the sheet-like articles of the invention is also enhanced by earthing the layer or layers containing carbon black.

As mentioned above, in cases where the anti-dust surface is that of a foil of a vinyl chloride polymer, the exposed anti-dust surface should preferably be less than 2.3 mm. from the nearest surface of the foil of thermoplastics material containing carbon black. To obtain the maximum anti-dust effect, the exposed anti-dust surface should in fact be as near as possible to the nearest surface of the sheet or foil of thermoplastic containing carbon black. For practical purposes, however, it is convenient for the exposed surface to be within the range 1.1 mm. to 1.5 mm. from the nearest surface of a foil of thermoplastic containing carbon black, particularly when "Vulcan" XC–72 is being used as the carbon black at the level of 40–50 parts per hundred by weight.

The individual foils making up the laminated sheet may be of any suitable thickness provided the conditions mentioned hereinbefore are observed. However, the foils containing the carbon black are preferably within the thickness range 0.25 to 0.76 mm.

Any suitable method may be used to laminate the individual foils to produce the laminated sheets or sheet-like articles of the invention. One particularly preferred method is to subject the foils to heat and pressure in a hydraulic ram press so that the individual foils are fused together.

An advantage of the invention lies in the fact that the exposed and viewable anti-dust surfaces of the sheets or sheet-like articles may be obtained in any desired colour or hue simply by incorporation of the requisite additive or pigment into the exposed foil during its production. This is particularly important where the sheet is to perform some decorative function as well as a practical purpose, so that a black-coloured exterior would be unsuitable. There may be also instances where a black surface is unsuitable for other reasons, for example where the sheet is required to reflect heat or light, in which case a white or light-coloured surface would be far more suitable than a black surface.

The laminated structure of our sheets is also advantageous in that it may allow the possibility of making the foil containing carbon black from a cheap but sufficiently robust thermoplastic material while reserving a more expensive thermoplastic material if necessary for the foil(s) to be exposed. If required, the foil containing carbon black may be a major or the major load bearing constituent of the sheet, the outer exposed foil(s) providing other desired properties.

Another advantage of the invention lies in the fact that it is not necessary to incorporate the carbon black into the whole of the sheet so that the conductive additive is more economically utilized. This also means that the embrittling effect of carbon black may be largely avoided.

The laminated sheets of the invention may be used in a variety of applications such as cladding, signs of one sort or another, household and hospital articles such as trays, covers, wall cladding, boxes, counter or table tops, and shelves. Such articles may be washed and wiped without the anti-dust behaviour being lost. Another useful application envisaged for the invention is gramophone records in which the carbon black may be incorporated into the interior of the record while leaving the surface layers free of any conductive materials which might tend to affect sound quality. Further, the carbon black may be dispersed in a cheap thermoplastic material in the interior of the record while the surface layers comprise a more expensive, hard-wearing thermoplastic material.

The invention is further illustrated by the following example.

EXAMPLE

Three poly(vinyl chloride) foils, each 0.5 mm. thick and stabilised with a standard lead stabiliser system and containing no carbon black, were laminated together by heat and pressure in conventional manner in a hydraulic ram press. The resulting laminated sheet was struck several times with a nylon cloth on one of its surfaces which was then placed 32 mm. above a tray containing cigarette ash. The struck surface immediately became well coated with ash particles which were strongly attracted to it.

A laminated sheet was prepared in the same manner except that the centre poly(vinyl chloride) foil had 40 p.h.r. of "Vulcan" XC–72 carbon black incorporated evenly therein. The resulting sheet was also struck several times with a nylon cloth and was placed 32 mm. above a tray containing cigarette ash. The struck surface, unlike that of the sheet containing no carbon black, showed no tendency to attract ash particles and remained completely uncoated with such particles.

A similar sheet with a centre foil containing 30 p.h.r. of "Vulcan" XC–72 also exhibited strongly anti-dust behaviour but a sheet with a centre foil containing 15 p.h.r. by weight of "Vulcan" XC–72 exhibited diminished anti-dust behaviour although still more than a sheet containing no carbon black at all. Sheets with a centre foil containing less than 15 p.h.r. of "Vulcan" XC–72 exhibited only slight anti-static behaviour.

It is interesting to note that even the most strongly anti-dust surfaces of the sheets of the invention exhibit no drop in surface resistivity compared with strongly static surfaces of sheets not made according to the invention. Thus an ordinary poly(vinyl chloride) sheet containing no carbon black had a surface resistivity of approximately $10^{13}$ ohms, and the anti-dust surface of the sheets of the invention made from poly(vinyl chloride) had a similar surface resistivity. This is in spite of the fact that B.S. 2050 teaches that a surface should have a surface resistivity of between $5 \times 10^4$ and $10^8$ ohms if it is to show anti-static behaviour. This apparent anomaly provides good evidence for the correctness of the theory hereinbefore described.

We claim:

1. A laminated sheet or sheet-like article made of thermoplastics material having an anti-dust surface comprising at least one pre-formed foil having at least 10 parts by weight of carbon black incorporated therein, per hundred parts by weight of said foil, and at least one other preformed foil not having carbon black incorporated therein, the last mentioned foil providing an outer surface of the laminated sheet as an antidust surface spaced less than 2.3 mm. over substantially all its area from the nearest surface of the foil having carbon black incorporated therein.

2. A laminated sheet or sheet-like article according to Claim 1 comprising at least one pre-formed foil having carbon black incorporated therein sandwiched between other pre-formed foils not having carbon black incorporated therein, so that at least one of the outer surfaces of the laminated sheet which are provided by two foils not having carbon black incorporated therein provides an anti-dust surface.

3. A laminated sheet or sheet-like article according to Claim 2 comprising a single foil having carbon black incorporated therein sandwiched between two outer foils not having carbon black incorporated therein.

4. A laminated sheet or sheet-like article according to Claim 1 wherein the thermoplastics material is a vinyl chloride polymer or copolymer.

5. A laminated sheet or sheet-like article according to Claim 1 wherein said at least one foil contains 20 to 50 p.h.r. of carbon black.

6. A process for the production of a laminated sheet or sheet-like article according to Claim 1 comprising forming the component foils of the laminate which comprise at least one foil having carbon black incorporated therein and at least one other foil not having carbon black incorporated therein, assembling the foils one upon the other in the required order for the laminate so that said at least one foil not having carbon black incorporated therein is positioned to provide an outer surface of the laminated sheet, and applying heat and pressure to the assembly of foils to form the laminate.

7. A process according to Claim 6 comprising forming the component foils of the laminate which comprise at least one foil having carbon black incorporated therein and at least two coils not having carbon black incorporated therein, assembling the foils one upon the other in the required order for the laminate so that said at least one foil having carbon black incorporated therein is sandwiched between said at least two foils not having carbon black incorporated therein which provide the outer surfaces of the laminate, and applying heat and pressure to the assembly of foils to form the laminate.

References Cited

UNITED STATES PATENTS 3,445,318   5/1969   Brams _____ 260—41 R

MARIONE E. McCAMISH, Primary Examiner

U.S. Cl. X.R.

161—168, 182, 247, 252; 260—41 R; 264—58